(12) United States Patent
Jabara et al.

(10) Patent No.: US 9,698,477 B1
(45) Date of Patent: Jul. 4, 2017

(54) CELL TOWER AND METHOD OF USE

(71) Applicant: Mobilitie, LLC, Newport Beach, CA (US)

(72) Inventors: Gary B. Jabara, Irvine, CA (US);
Christos Karmis, Irvine, CA (US);
Jason Caliento, Hinsdale, IL (US);
Justin deHart, Santa Ana, CA (US);
Michael Thomas Trampetti, St. Paul, MN (US); Russell J. Lofquist, Mt. Prospect, IL (US); Jonathan Levine, Chicago, IL (US)

(73) Assignee: Mobilitie, LLC, Newport Beach, CA (US)

( * ) Notice: Subject to any disclaimer, the term of this patent is extended or adjusted under 35 U.S.C. 154(b) by 0 days.

(21) Appl. No.: 15/062,709

(22) Filed: Mar. 7, 2016

(51) Int. Cl.
| | |
|---|---|
| *H04W 88/10* | (2009.01) |
| *H01Q 1/42* | (2006.01) |
| *E04H 12/08* | (2006.01) |
| *H01Q 1/44* | (2006.01) |
| *E04H 12/34* | (2006.01) |
| *E04H 12/02* | (2006.01) |
| *E04H 12/00* | (2006.01) |

(52) U.S. Cl.
CPC .............. *H01Q 1/44* (2013.01); *E04H 12/02* (2013.01); *E04H 12/34* (2013.01); *H04W 88/10* (2013.01); *E04H 2012/006* (2013.01)

(58) Field of Classification Search
CPC ........ H01Q 1/246; H01Q 1/44; E04H 12/003; E04H 12/342; H04W 88/10
USPC .................. 455/561; 343/853, 872, 874, 879
See application file for complete search history.

(56) References Cited

U.S. PATENT DOCUMENTS

| | | | | |
|---|---|---|---|---|
| 5,611,176 | A * | 3/1997 | Juengert | A41G 1/001 428/18 |
| 6,173,537 | B1 * | 1/2001 | Davidsson | E04H 12/08 343/890 |
| 6,222,503 | B1 * | 4/2001 | Gietema | H01Q 1/1207 343/700 MS |
| 8,125,403 | B2 * | 2/2012 | Hager | H01Q 1/1242 343/874 |
| 2004/0174317 | A1 * | 9/2004 | Dearnley | H01Q 1/1207 343/890 |
| 2006/0232478 | A1 * | 10/2006 | Chen | H01Q 1/38 343/700 MS |
| 2010/0026604 | A1 * | 2/2010 | Caldwell | H01Q 1/1242 343/890 |

* cited by examiner

*Primary Examiner* — Nathan Taylor
(74) *Attorney, Agent, or Firm* — Davis Wright Tremaine LLP; Michael J. Donohue

(57) ABSTRACT

A cell tower is manufactured from a steel plate that is pressed into a polygon form, such as a 12-sided polygon or a 16-sided polygon. The tower is designed for direct embedding into the ground or attachment to a buried portion. The base portion contains apertures sized to permit the installation of an equipment rack directly into the interior of the tower. Other apertures in the tower provide handholes for installation of the equipment, backup batteries, and cabling. The top section of the cell tower includes mounting members for one or more sets of cellular radio antennas and/or microwave antennas. The antennas, and associated remote radio units, are mounted to the top of the cell tower and are hidden from view by one or more shrouds. The shrouds provide a visible barrier, but have minimal impact on the radio frequency characteristics.

31 Claims, 10 Drawing Sheets

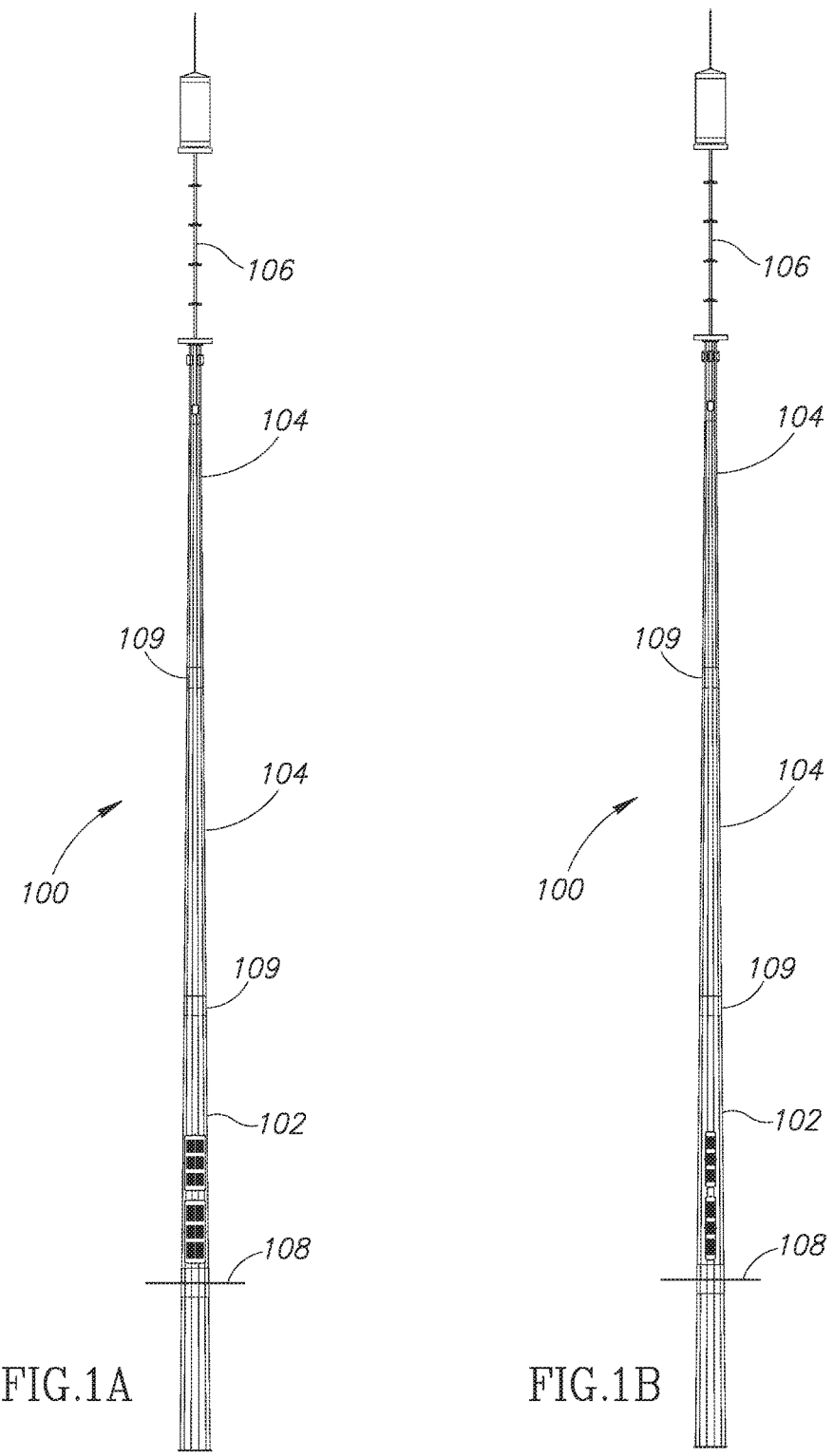

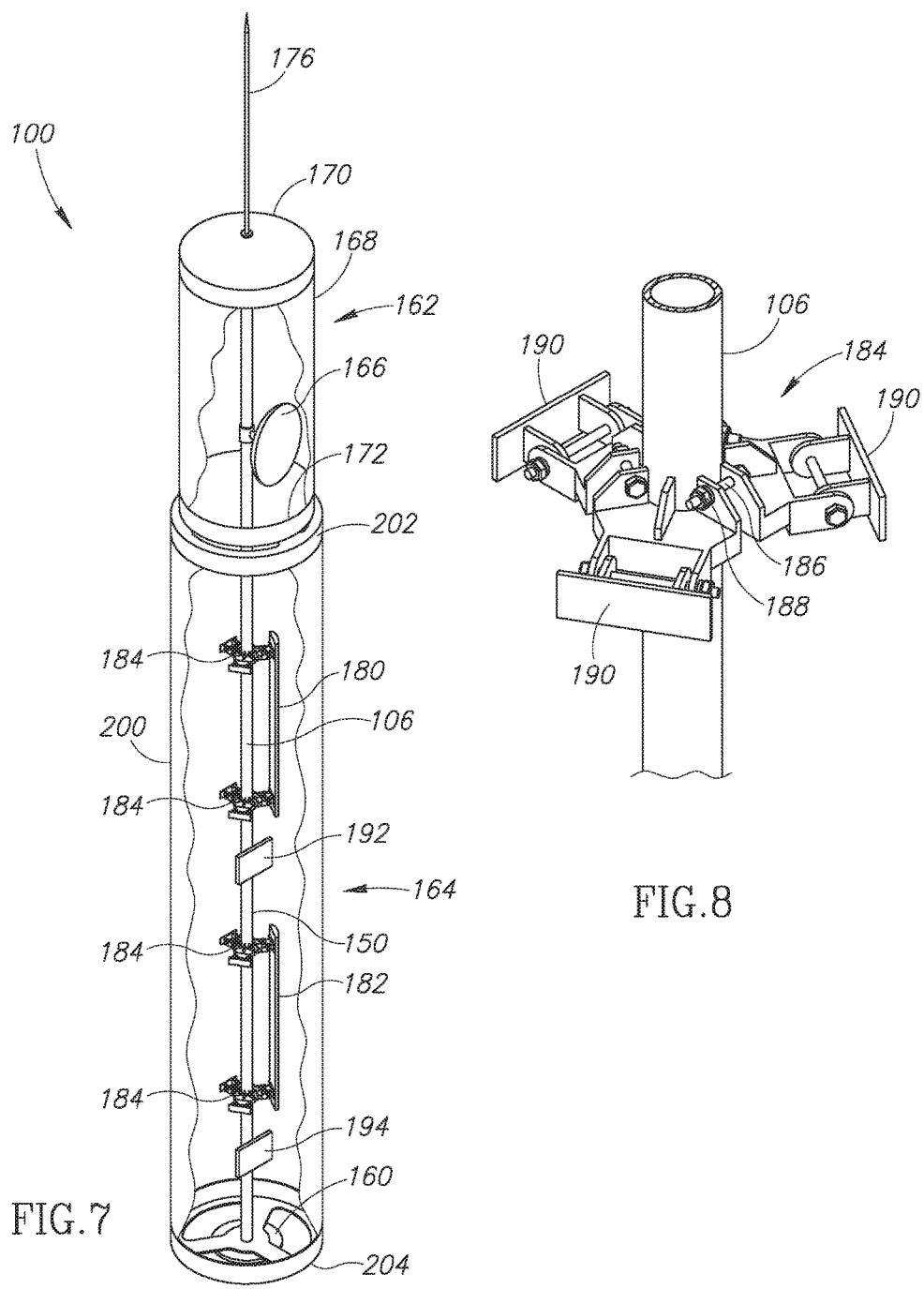

CELL TOWER AND METHOD OF USE

BACKGROUND OF THE INVENTION

Field of the Invention

The present disclosure relates generally to cellular networks and, more particularly, to a cell phone tower and method of operation.

Description of the Related Art

Cellular telephone networks typically operate at high frequencies. Early cellular networks operate at 800 MHz while newer cell phone systems operate at 1900 MHz and 2400 MHz. The high operational frequencies, limits the range of any given cellular transmitter. For this reason, it is necessary for a cellular network operator to deploy an extensive network of cell towers to provide network coverage over a broad geographic area.

The cell towers are sometimes mounted on tall buildings to provide extended operational range. In other areas it is necessary to build a cell tower with antennas mounted at the top portion of the tower. Early cell tower designs were often reminiscent of an oil drilling rig with a three-legged tower having cross-beams between the legs for structural support. One can appreciate that such towers are highly visible and often aesthetically displeasing. This may be particularly true given the ubiquitous nature of cell towers.

Newer tower designs use a single pole (i.e., a monopole) and sometimes try to disguise the pole as a tree. The electrical equipment necessary to operate the cell tower is often located in a small building adjacent to the tower. Although the monopole design improves the aesthetics of the cell tower, the electronics out-building is undesirable. Therefore, it can be appreciated that there is a significant need for a cell tower with low profile and improved operational characteristics. The present disclosure provides this, and other advantages, as will be apparent from the following detailed description and accompanying figures.

BRIEF DESCRIPTION OF THE SEVERAL VIEWS OF THE DRAWING(S)

FIG. 1A is a front side view of an entire cell tower installation in accordance with the present disclosure.

FIG. 1B is a rear side view of an entire cell tower installation in accordance with the present disclosure.

FIG. 7 is a perspective view of the top tower portion of the cell tower of FIG. 1 illustrating the placement of electronic components.

FIG. 8 is a close-up view of the mounting assembly used to attach the antenna components to the top of the cell tower of FIG. 1.

DETAILED DESCRIPTION OF THE INVENTION

Figure 1C:
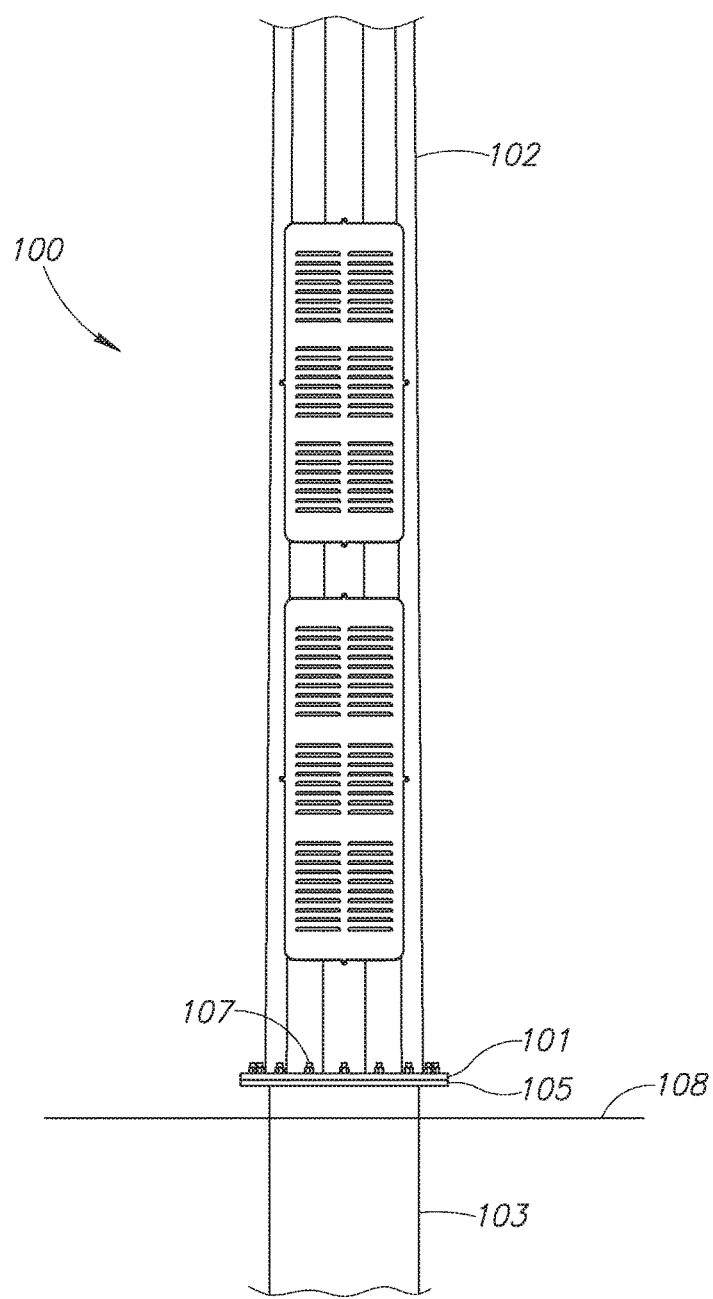
FIG. 1C is a partial front side view of the base section of the cell tower with an alternative attachment configuration.

The present disclosure is directed to a cell tower design in which the electronics are integrated into the hollow center of the pole. This integration improves operational characteristics of the cell tower and also eliminates the need for an electronics out-building. The overall solution helps meet design requirements and zoning requirements for right-of-way (ROW) installation. As will be described in greater detail below, the pole also provides for modular installation of antenna sections at the top of the pole. Each antenna system is contained within a non-conductive canister that protects the antennas from the environment, provides a more environmentally and aesthetically pleasing view, and enables unimpeded wireless transmission and reception from the antennas contained within the canisters. The antenna canisters and radio placements and overall layout are conducive to allowing a multi-carrier pole with all equipment internally contained therein.

FIG. 1A illustrates a front side view of a cell tower 100 mounted at a tower location site. The cell tower 100 comprises a base section 102, one or more midsections 104, and a tower top section 106.

The cell tower 100 is manufactured from steel. In one embodiment, the cell tower is tapered from a diameter of approximately 33 inches at the base section 102 to approximately 14 inches in diameter at the upper portion of the midsection 104. In one embodiment, there is a substantially linear taper from the base section 102 to the top of the midsection 104.

A monopole is traditionally caisson-mounted with a reinforced concrete structure buried underground. However, the design of the cell tower 100 is a direct-embed pole that requires no additional foundations for mounting. The cell tower 100 is inserted into the ground much like a telephone pole. In FIGS. 1A-1B, the ground surface or finished grade is represented by the reference 108. In a typical direct-embed implementation, approximately 10%-15% of the total length of the cell tower 100 is below finished grade 108.

In an alternative embodiment, shown in FIG. 1C, the base section 102 terminates in a mounting flange 101 extending around the periphery of the cell tower 100 at the bottom end. Instead of a direct-embed implementation, a buried portion 103 is placed in the ground in a conventional fashion and may be caisson-mounted with reinforced concrete or directly embedded. The top of the buried section 103 extends slightly above finished grade 108 and terminates in a flange 105 configured to mate with the flange 101. The flanges 101 and 105 include a plurality of spaced-apart holes (not shown). The holes are aligned and fasteners 107, such as nuts and bolts, may be used to join the base section 102 of the cell tower 100 to the buried portion 103.

Figure 4:
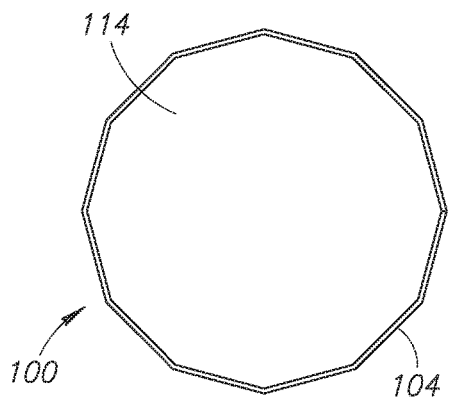
FIG. 4 is a cross-section view of the twelve-sided cell tower of FIG. 3A taken along the line A-A.
Figure 5:
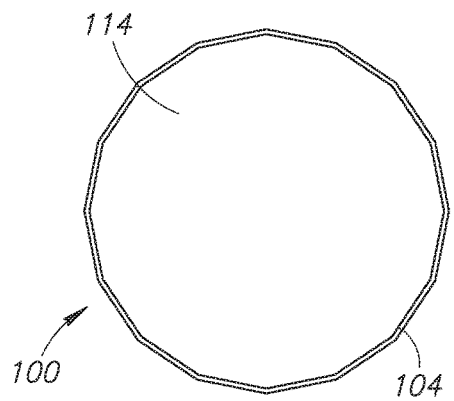
FIG. 5 is a cross-section view of a sixteen-sided cell tower.

In one embodiment, the cell tower 100 has a circular cross-section. However, in other embodiments, the cross-section of the cell tower may be a polygon, such as a 12-sided polygon or a 16-sided polygon. FIG. 4 is a cross-section of the cell tower 100 taken at line A-A in FIG. 3A. Although the other drawings illustrate a 12-sided polygon, the cell tower 100 may be a 16-sided polygon, as illustrated in the cross-section of FIG. 5. In an exemplary embodiment, the base portion 102 and the midsection 104 may be formed by continuous sheet press of steel into the desired polygon shape. The seam may be welded for structural integrity. In a typical implementation, the polygon cross-sections are regular polygons such that each side of the polygon is equal in length and the internal angles of the polygon sides are all equal. In a typical implementation, the cell tower 100 is approximately 120 feet tall. However, those skilled in the art will appreciate that the tower height can be adjusted to accommodate the particular setting of the cell site location and/or the antenna and radio requirements of the cell tower.

The midsection 104 may be joined to the base section 102 using a conventional slip-joint 109. In an exemplary embodiment, one section of the cell tower 100 is slipped into the next section to form the slip-joint 109. For example, the upper end of the bottom section 102 (see FIG. 1A) is slipped into the lower end of the midsection 104 to form the slip-joint 109. In one embodiment, the slip-joint may provide for an overlap of approximately four feet between the two sections being joined together. Following installation, the pieces may be further joined together by screws or by some other fastening means, such as welding. The top section 106 is bolted to the top of the midsection 104, as will be described in greater detail below.

Figure 2A:
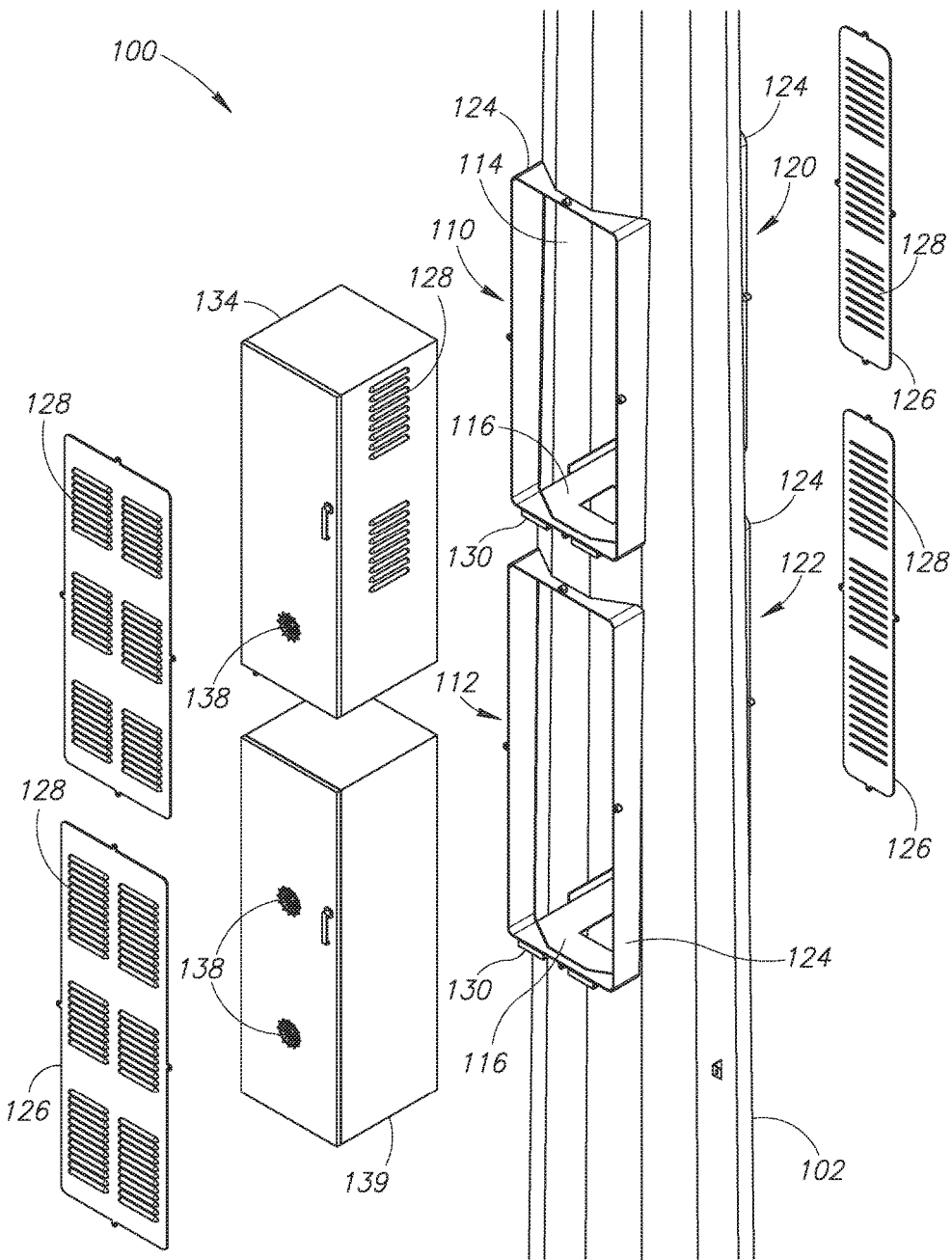
FIG. 2A is a partial exploded front perspective view of the base section of the cell tower of FIG. 1A.
Figure 2B:
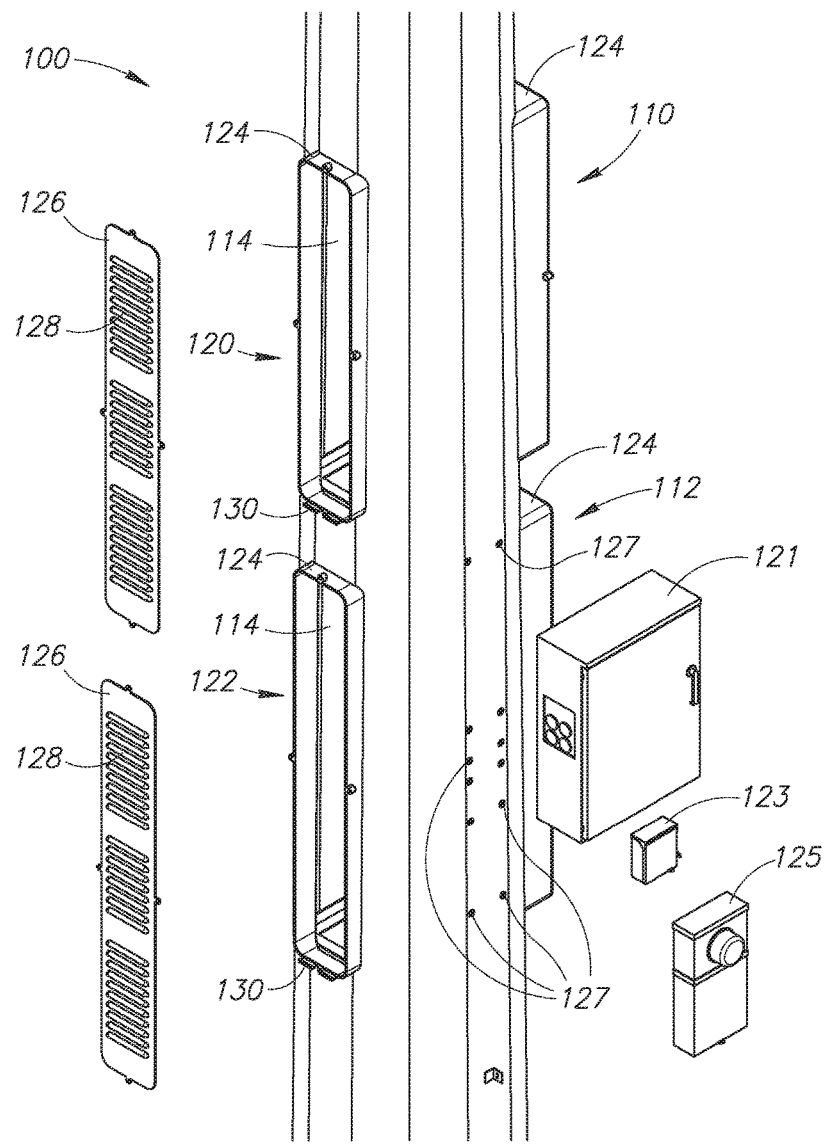
FIG. 2B is a partial exploded rear perspective view of the base section of the cell tower of FIG. 1B.

As best illustrated in FIGS. 2A-2B, the base section 102 of the cell tower 100 contains a plurality of openings or apertures, sometimes referred to as "handholes." FIG. 2A illustrates handholes 110-112 in the base section 102. The handhole 110 provides access to a hollow interior portion 114 of the base section 102. FIG. 2A illustrates a baseband unit cabinet 134 that contains electronics such as baseband filters, amplifiers, and the like, as well as cell site router equipment. The baseband unit cabinet 134 may be conveniently pre-assembled and installed as an integrated unit into the interior 114 of the cell tower 100 using the handhole 110.

The handhole 112 provides access to the interior 114 of the base section 102 for the installation of a battery cabinet 139. Those skilled in the art will appreciate that cell towers typically have an array of nickel cadmium (NiCAD) or gel batteries to provide power to the cell tower 100 in the event of a temporary loss of external power.

The apertures 110-112 are sized to receive the baseband unit cabinet 134 and the battery cabinet 139. In one embodiment, a rack support 116 may be welded or fastened to the interior 114 of the base section 102. The rack supports 116 are sized to receive and retain equipment, such as the baseband unit cabinet 134 and the battery cabinet 139. This approach allows the electronic components and back-up battery packs to be pre-assembled offsite and delivered to the tower location site for installation as a unit. This simplifies the installation and maintenance of the cell tower 100.

FIG. 2B illustrates handholes 120-122 on the rear side of the cell tower 100 opposite the handholes 110-112, respectively. In an exemplary embodiment, the handholes 120-122 are smaller in size than the handholes 110-112. The handholes 110-112 are sized to receive the electronic equipment while the handholes 120-122 provide access to the cabling at the rear of the baseband unit cabinet 134 and battery cabinet 139. For improved structural integrity, the handholes 120-122 may be smaller in size, similar to handholes 144-148 (see FIG. 6).

In an exemplary embodiment, the handholes 110-112 and 120-122 are surrounded by handhole collars 124. The handhole collars 124 improve the structural integrity of the cell tower 100 in areas where the sidewall of the cell tower has been cut to provide the various handholes. The handhole collars 124 are typically welded to the cell tower 100. A series of handhole covers 126 are sized to cover the various handholes 110-112 and 120-122. The handhole covers 126 may include a plurality of ventilation slots 128. In one embodiment, the bottom portion of the handhole collars 124 may include a cover support lip 130 to retain the bottom portion of the handhole covers 126 for ease in installation.

In one embodiment, the handhole covers 126 are attached to the respective handhole collars 124 using security bolts (not shown). In another embodiment, the handhole covers 126 may be affixed to the handhole collars 124 using hinges on one side such that the handhole covers are configured as doors that swing to an open position to provide access to the interior 114 of the cell tower 100. Those skilled in the art will appreciate that conventional intrusion detection technology may also be employed with the cell tower 100 to detect unauthorized access to the interior 114 of the cell tower.

FIG. 2B also illustrates external power support infrastructure for the cell tower 100 including a power protection cabinet 121, a disconnect switch 123, and a power meter 125. These are commercially available components that need not be described in greater detail herein. The power protection cabinet 121, disconnect switch 123, and power meter 125 are mounted on the external portion of the cell tower 100 via a polarity of mounting holes 127.

Figure 2C:
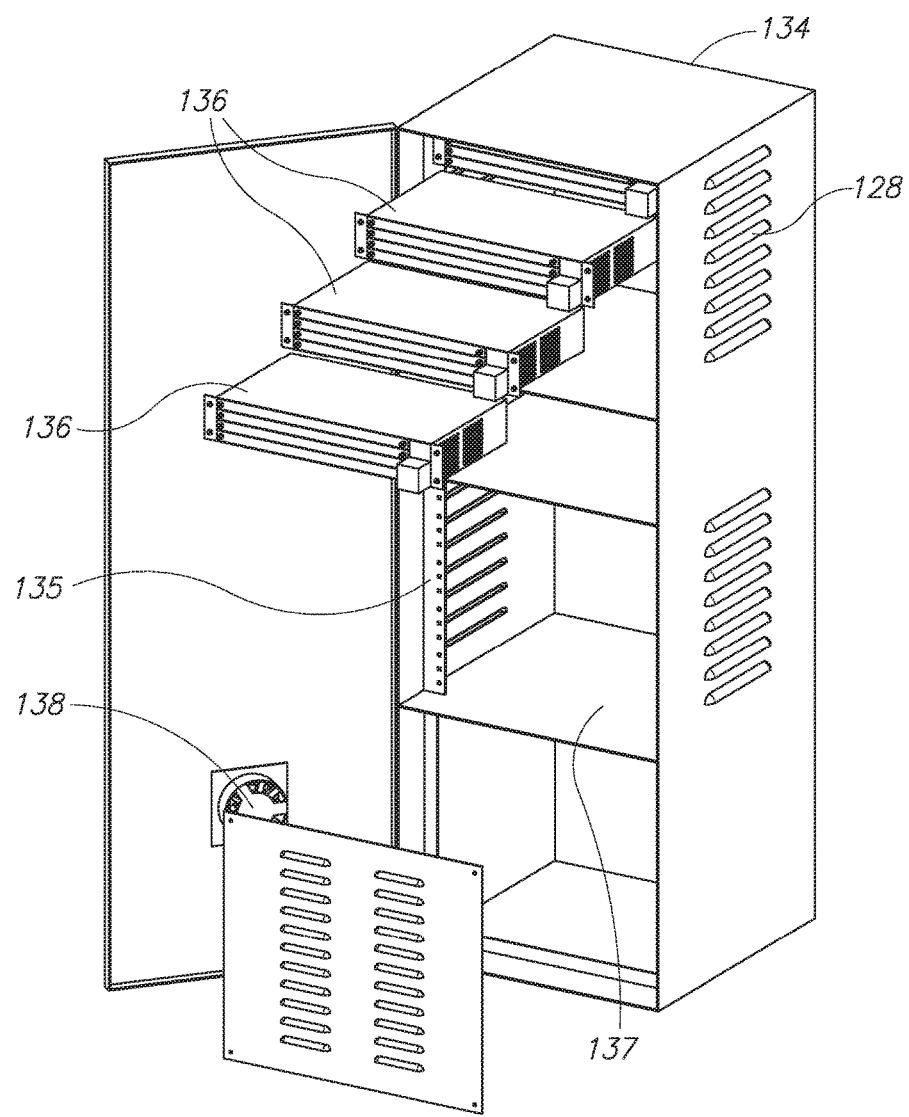
FIG. 2C illustrates an embodiment of a radio equipment cabinet illustrated in FIG. 2A.

FIG. 2C illustrates details of the baseband unit cabinet 134. The interior of the baseband unit cabinet 134 includes rack mounts 135 such that electronic equipment may be mounted in conventional electronic equipment racks. FIG. 2C also illustrates baseband electronics 136, which are commercially available electronic components. Operational details of the baseband electronics 136 are known to those of skill in the art and need not be described herein. The rack arrangement of the baseband electronics 136 provides for simple installation and removal and maintenance. In one embodiment, the baseband electronics 136 may be installed in the baseband unit cabinet 134 offsite and installed into the cell tower 100 as an integrated unit. Although not illustrated herein, the cables at the back of the baseband electronics 136 are accessible through the handhole 120, illustrated in FIG. 2B. FIG. 2C also illustrates one or more spare bays 137 configured to receive additional baseband electronics 136. The spare bay 137 allows for expansion of services in the cell tower 100. For example, the spare bay 137 may be used to provide the baseband electronics 136 for a different cellular network provider. FIG. 2 also illustrates ventilation slots 128 and a ventilation fan 138 to provide necessary cooling.

Figure 2D:
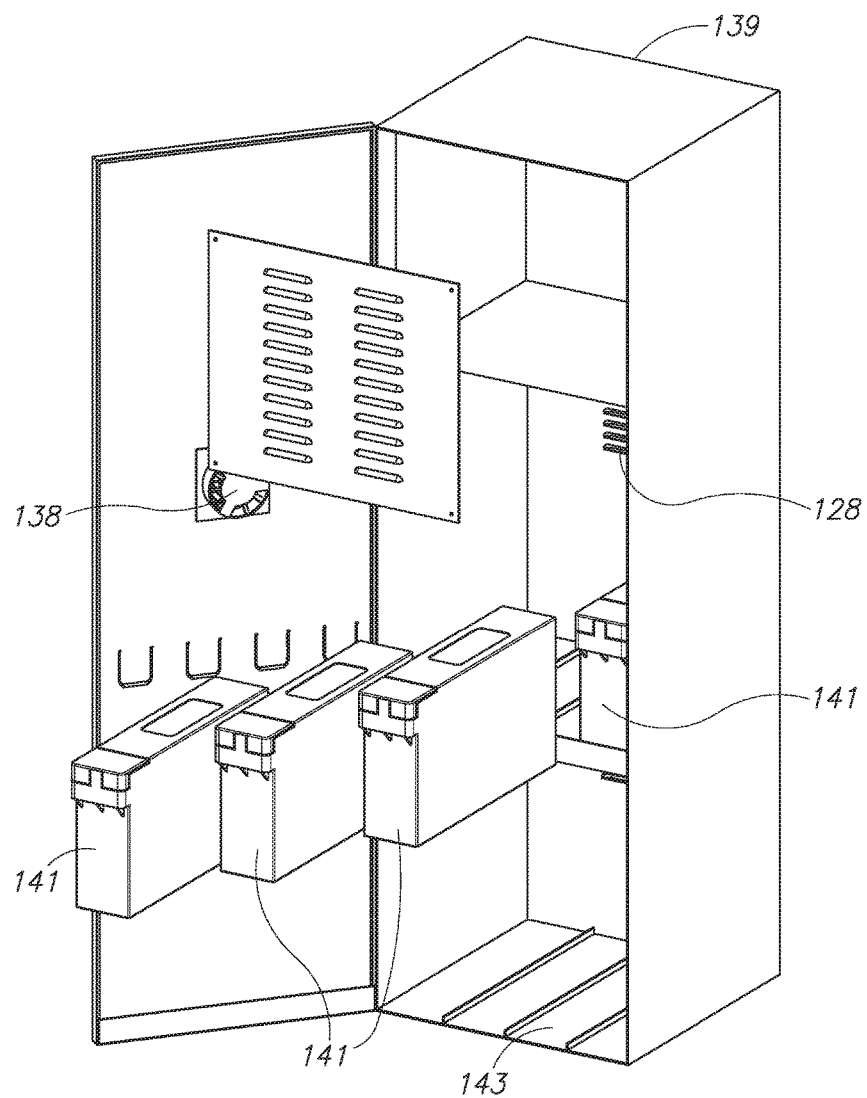
FIG. 2D illustrates an embodiment of a battery backup cabinet illustrated in FIG. 2A.

FIG. 2D illustrates details of the battery cabinet 139. A series of battery modules 141 are placed within battery slots 143 inside the battery cabinet 139. FIG. 2D illustrates four battery modules 141 as well as provisions for spare battery modules. The battery cabinet 139 also includes ventilation slots 128 and one or more ventilation fans 138. The battery cabinet 139 may be conveniently preconfigured offsite to include the necessary number of battery modules 141. The pre-assembled battery cabinet 139 may be installed in the cell tower 100 through the handhole 112 (see FIG. 2A) as an integrated unit. Cabling access to the battery modules 141 are possible via the handhole 122.

Figure 3A:
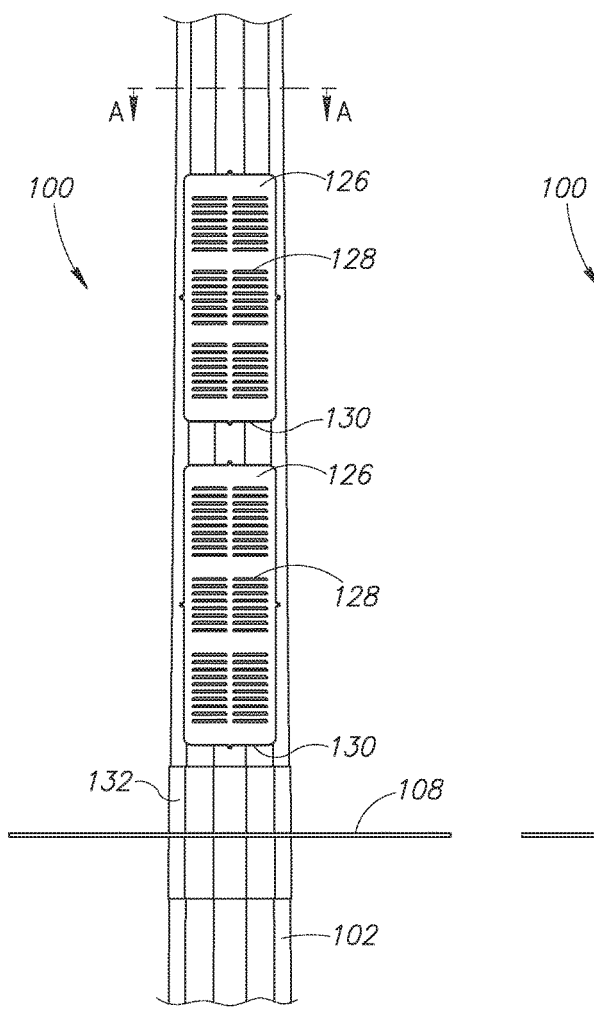
FIG. 3A is a partial front side view of the base section of the cell tower of FIG. 2A with the handhole cover in place.
Figure 3B:
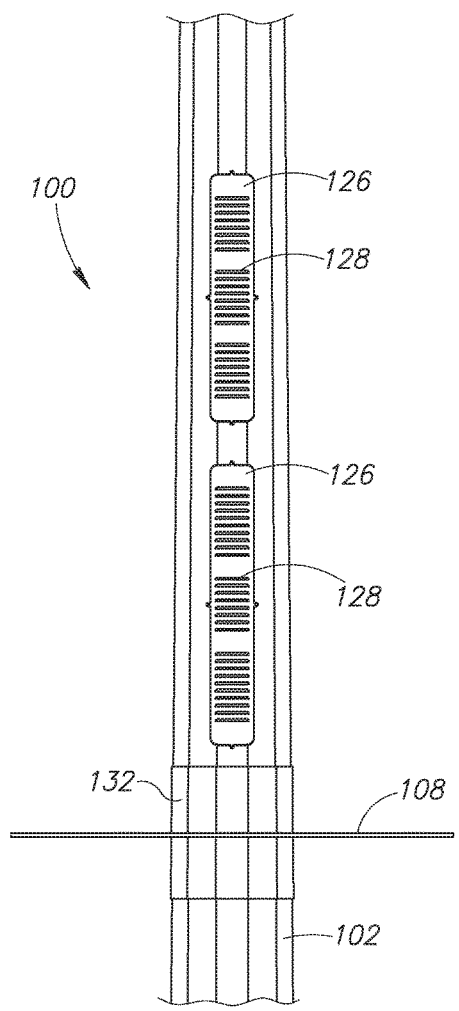
FIG. 3B is a partial rear side view of the base section of the cell tower of FIG. 2B with the handhole cover in place.

FIGS. 3A and 3B are partial front and rear side elevation views, respectively, that illustrate the base section 102 of the cell tower 100 with the handhole covers 126 mounted in place. FIG. 3A-3B also illustrate an optional steel collar 132 fixed to the base section 102 of the cell tower 100 and extending slightly above and slightly below the finished grade 108. The steel collar 132 may be welded to the base section 102 to provide greater strength at the point of entry of the cell tower 100 into the ground.

Figure 6:
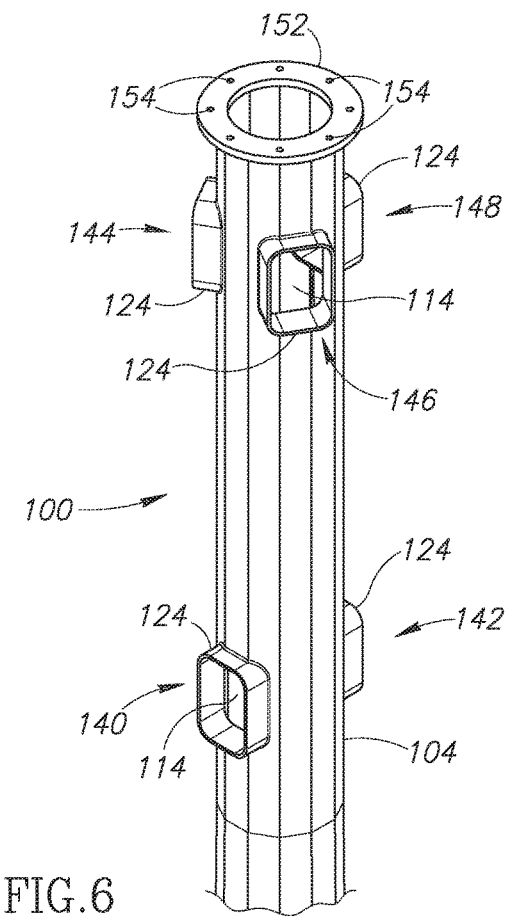
FIG. 6 is a perspective view of the top portion of the cell tower of FIG. 1 with the top tower section removed.

FIG. 6 illustrates the top of the midsection 104 of the cell tower 100. Illustrated in FIG. 6 are a plurality of handholes 140-148. The handholes 140-148 are provided to assist in the routing and maintenance of cables running from the equipment cabinets in the base section 102 to the radios and antennas on the top section 106 (see FIGS. 1A-1B) of the cell tower 100. Although the cell tower 100 could have fewer handholes at the top of the midsection 104, the handholes 140-148 illustrated in FIG. 6 are configured to correspond to different radio units on the top section 106 of the cell tower 100. The handholes 140-142 are microwave cable ports that allow a technician access to the cable routing for the microwave antennas, which are mounted to the top section 106 (see FIGS. 7 and 9) of the cell tower 100.

The handholes 144-148 are radio cable ports that allow a technician access to the cabling for the cellular antennas and remote radio units (RRUs) in the top section 106. In addition to handhole separation by function (e.g., microwave versus cellular), the handholes 144-148 correspond to the respective sectors used in a typical cell tower. Those skilled in the art will appreciate that a typical cell tower provides an area of coverage that is broken into sectors. Three sectors is a common cell coverage plan. The three handholes 144-148 can separate the cabling by sector to simplify installation, maintenance and troubleshooting, and replacement.

As previously described with respect to the handholes 110-112 and 120-122, the handholes 140-148 may be surrounded by handhole collars 124 and handhole covers (not shown). The uppermost portion of the midsection 104 terminates with a flange or mounting member 152 and a plurality of mounting holes 154. As will be described in detail below, the flange 152 mates with a portion of the top section 106 of the cell tower 100 and bolts (not shown) are used to fasten the top section to the flange 152 to thereby securely attach the top section 106 of the cell tower 100.

FIG. 7 provides details of an exemplary embodiment of the top section 106 of the cell tower 100. In one embodiment the top section 106 may be implemented as a three inch diameter galvanized steel pipe 150. A bottom flange 160 is sized to mate with the flange 152 on the midsection 104 of the cell tower 100. The bottom flange 160 may comprise a plurality of holes that align with the holes 154 (see FIG. 6) in the flange 152. Alternatively, one flange (e.g., the bottom flange 160) may have mounting studs that are fixedly attached thereto. The mounting holes 154 in the flange 152 are positioned to align with the studs.

The top section 106 is designed to provide great flexibility in configuration of RRUs and antennas for one or more cellular service providers. In an exemplary embodiment, illustrated in FIG. 7, the top section 106 is divided into a microwave portion 162 and a cellular radio portion 164. The microwave radio portion 162 is at the very top of the cellular tower 100 and it typically contains two or four microwave antennas. For the sake of clarity, FIG. 7 only illustrates one microwave antenna 166. Those skilled in the art will appreciate that the microwave link on the cell tower 100 may be used to implement a backhaul or for use as a donor site where cell traffic may be offloaded from one cell tower to another to provide a more balanced load. Operation of the microwave portion 162 of the cell tower 100 is well known in the art and need not be described in greater detail herein.

The microwave antenna 166 is contained within a shroud or canister 168. FIG. 7 illustrates a cutaway portion of the shroud 168 to illustrate the mounting of the microwave antenna 166 inside the shroud. The shroud 168 is manufactured from a non-conductive material that is visually opaque to provide a more esthetically pleasing appearance. The color of the shroud 168 may be selected to match nearby surroundings. While the shroud 168 is visually opaque, it is manufactured from materials selected to have little or no impact on the radio frequency (RF) characteristics of the microwave portion 162. That is, the shroud 168 will not alter the antenna pattern of the microwave antenna 166 or attenuate the RF signal to/from the microwave antenna.

In one embodiment, the shroud 168 may be manufactured from a Kevlar® material. Alternatively, the shroud 168 may be manufactured using a Gore-Tex® material. In yet another embodiment, the shroud 168 may be manufactured from a combination of these materials or other materials that provide satisfactory operating characteristics, as described above. For example, the shroud 168 may be manufactured with a polytetrafluoroethylene membrane, which provides a hydrophobic mesh. This is a flexible material that provides protection for the electronic components, but permits good ventilation and provides a visual barrier.

The shroud 168 may be manufactured from the flexible material, as described above. FIG. 7 illustrates a top shroud frame 170 and a bottom shroud frame 172. The shroud 168 may be attached to the top shroud frame 170 and bottom shroud frame 172 to help maintain its shape and to protect the components from the elements.

Alternatively, the shroud 168 may be manufactured from a stiff material, such as polyvinyl chloride (PVC) material. The PVC material is rigid. In this embodiment, the top shroud frame 170 and bottom shroud frame 172 may be unnecessary.

In one embodiment, the very top of the cell tower 100 may include a lightning rod 176. Operation of the lightning rod 176 is known in the art, and need not be described in greater detail herein.

The cellular radio portion 164 may typically comprise two sets of cellular antennas. As previously discussed, cellular radio antennas may typically be divided into three separate sectors. For the sake of clarity, FIG. 7 illustrates only a single sector antenna 180 and a sector antenna 182. Typically, the sector antenna 180 would be for one cellular frequency band (e.g., 800 MHz) and the sector antenna 182 would be for a different frequency band (e.g., 1900 MHz). The sector antennas 180-182 are attached to the top section 106 by a plurality of mounting members 184. The details of the mounting member 184 are illustrated in FIG. 8. The mounting members 184 may be clamped to the top section 106 at any desired location and orientation by the technician doing an initial installation. In an exemplary embodiment, FIG. 8 illustrates a bolt 186 and a nut 188. A plurality of the bolts 186 and nuts 188 are used to clamp the radio mounting member 184 to the top section 106. Each radio mounting member 184 also has rotatable mounting plates 190 to mate with the respective sector antennas. Those skilled in the art will appreciate that the mounting plates 190 may contain screw holes or other conventional means for attaching the sector antennas (e.g., the sector antenna 180) to the mounting plate 190.

Those skilled in the art will appreciate that current cellular technology employs the RF portions of the system at a location near the top of the cell tower 100 close the sector antennas. The electronics in the base section 102 of the cell tower 100 contain baseband equipment. The RRUs, which includes the RF components, are attached to the top section 106. FIG. 7 illustrates an RRU 192 for use with the sector antenna 180. A different RRU (not shown) is provided for each of the other sector antennas (not shown) corresponding to the sector antenna 180. FIG. 7 also illustrates an RRU 194 designed for operation with the sector antenna 182. A different RRU (not shown) is provided for each of the other sector antennas (not shown) corresponding to the sector antenna 182.

In the embodiment illustrated in FIG. 7, the cellular radio portion 164 is contained within a single shroud 200. As described above with respect to the shroud 168, the cellular radio canister 164 includes a top shroud frame 202 and a bottom shroud frame 204. The shroud 200 may be manufactured of materials similar to that discussed above with respect to the shroud 168. If the shroud 200 is manufactured of a flexible material, the top shroud frame 202 and bottom shroud frame 204 can serve to maintain rigidity of the shroud 200 and to protect the electronic components from the elements. If the shroud 200 is manufactured from a rigid material, such as PVC, the top shroud frame 202 and bottom shroud frame 204 may serve to at least partially seal the cellular radio portion 164 from the elements.

Although FIG. 7 illustrates a single shroud 200 for both cellular antennas (e.g., the cellular antenna 180 and the cellular antenna 182), it is possible to provide a separate shroud for each cellular antenna). In the example of FIG. 7, there would be three shrouds corresponding to the microwave portion 162 and two cellular portions 164, respectively. In another embodiment, the top section 106 could have a single shroud for both the microwave portion 162 and the cellular portion 164.

Those skilled in the art will also appreciate the modular nature of the top section 106 permits easy replacement of components and the addition of new components. For example, a third set of cellular antennas and RRUs could be installed for a different frequency band or for a different cell service provider. In an alternative embodiment, the top section 106 of the cell tower 100 can include a multi-band cellular antenna 210 in place of the separate cellular antennas 180 and 182 illustrated in FIG. 7. In this embodiment, illustrated in FIG. 9, the cellular portion 164, containing multi-band cellular antenna 210, may be located at the top of the cell tower 100 in place of the microwave portion 162 in FIG. 7.

The multi-band cellular antenna 210 comprises three sector antennas 212 mounted to a central support. The multi-band cellular antenna 210 is enclosed within a shroud 214. The shroud 214 may be manufactured using any of the techniques described above with respect to the shroud 168 or the shroud 200 illustrated in FIG. 7.

Figure 9:
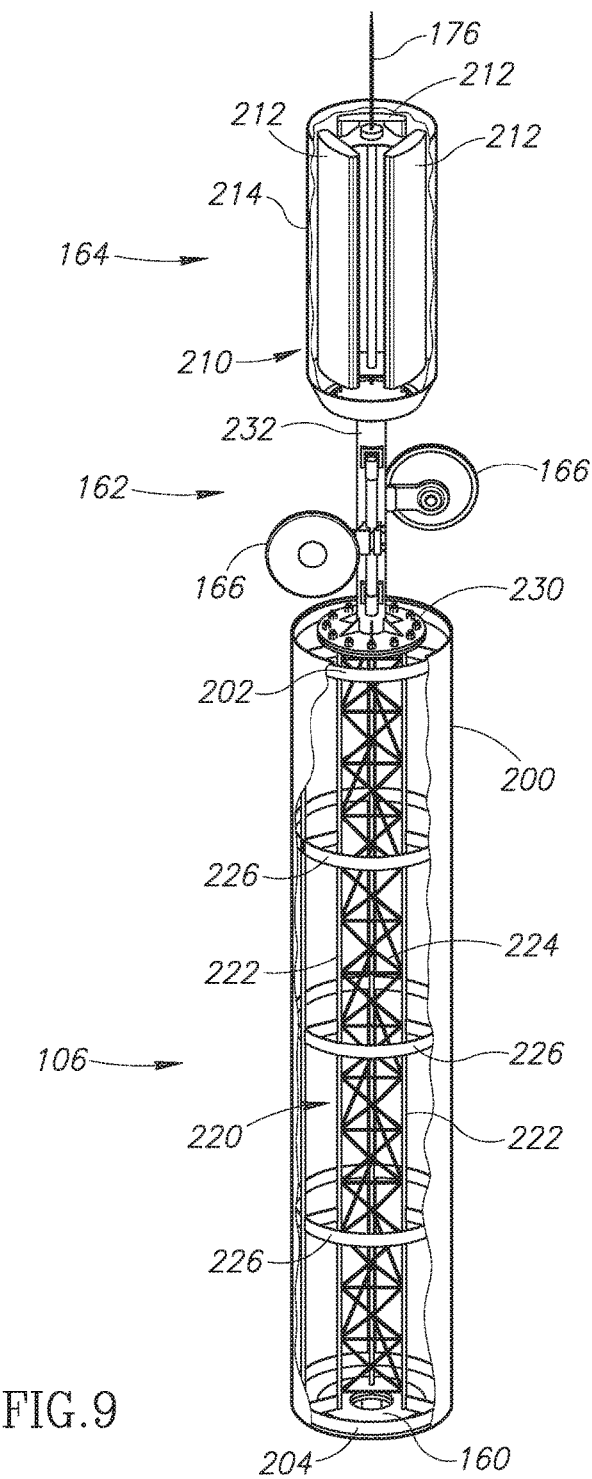
FIG. 9 is a perspective view of an alternative implementation of the top tower portion of the cell tower of FIG. 1 illustrating the placement of electronic components.

In the embodiment of FIG. 9, the galvanized steel pipe 150 (see FIG. 7) is replaced by a lattice tower 220. In one embodiment, the lattice tower 220 is implemented in a triangular shape with three tower legs 222 connected to each other through a series of cross-braces 224 to provide structural rigidity. The lattice tower 220 is coupled to the bottom flange 160 for mating with the top flange 152 in the manner described above with respect to the embodiment of FIG. 7.

The lattice tower 220 is surrounded by the shroud 200 in a manner similar to that described above. The top shroud frame 202 and bottom shroud frame 204 provide structural support and rigidity to the shroud 200. In addition, FIG. 9 illustrates a plurality of intermediate shroud frames 226 to provide additional support for the shroud 200 along its full length. The shroud 200 in the embodiment of FIG. 9 may be implemented using any of the techniques described above with respect to the shrouds 168 and 200 illustrated in FIG. 7.

At the top of the lattice tower 220 is a flange similar to the flange 152 illustrated in FIG. 6. The flange at the top of the lattice tower 220 mates with a flange 230 at the bottom end of an extension pole 232. In an exemplary embodiment, the microwave antenna 166 is mounted on the extension pole 232. The top of the extension pole 232 also terminates in a flange (not shown) to mate with a flange at the bottom of the cellular portion 164. The flange mounting technique allows greater flexibility in replacing various portions of the top section 106 of the cell tower 100.

In the embodiment of FIG. 9, the RRUs 192 and 194 are not illustrated, but may be mounted on the lattice tower 220 within the shroud 200 with cabling (not shown) coupled between the RRUs and the multi-band cellular antenna 210.

As illustrated in FIGS. 7 and 9, the top tower section 106 can be readily configured to meet the operational requirements of one or more cell service providers. The antenna elements, RRUs, and RF filters can be easily mounted within the protective shrouds. The cell tower 100 provides for flexible placement of cellular radio components and microwave components. The modular arrangement also permits easy updates and replacement of broken or damaged components. Similarly, the base section 102 of the cell tower 100 permits the easy installation, repair, and replacement of the baseband cabinet 134 and battery cabinet 139.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cell tower mounted at a tower location site, comprising:
    a monopole having a base portion, one or more mid-pole portions, and a top tower portion with each of the plurality of portions having a bottom end and a top end and a sidewall extending from the bottom end to the top end to define an interior;
    the base portion comprising a buried portion and an equipment mounting portion and having:
        the bottom end of the buried portion being configured for direct embedding into ground at the tower location site with the buried portion being buried below grade and having a top end extending above grade;
        a first access aperture positioned in the sidewall of the equipment mounting portion of the base portion to permit access to the interior portion; and
        an aperture cover positionable to cover the first access aperture;
    the mid-pole portion positioned between the base portion and the top tower portion with the mid-pole portion bottom end coupled to the top end of the base portion and the mid-pole portion top end coupled to the bottom end of the top tower portion; and
    a first mounting member positioned at the top end of the mid-pole portion;
    the top tower portion having:
        a second mounting member positioned at the bottom end of the top tower portion and sized to mate with the first mounting member to thereby connect the top tower portion with the mid-pole portion;
        a plurality of radio mounting members adjustably coupled to the top tower portion and configured to receive and retain radio frequency (RF) components of a cellular radio, wherein the top section comprises RF equipment for microwave communication and for cellular communication; and
        a shroud attached to and extending around the top tower portion, the shroud being made from a material selected to provide a visibly opaque barrier and to have radio frequency characteristics that does not impede the transmission of radio frequency signals;
    the top end of the buried portion having a third mounting member and a bottom end of the equipment mounting portion having a fourth mounting member sized to mate with the third mounting member to thereby connect the equipment mounting portion with the buried portion.

2. The system of claim 1 wherein the sidewalls of the base portion and the mid-pole portion have a polygonal cross-section.

3. The system of claim 2 wherein the sidewalls of the base portion and the mid-pole portion have a 12-sided regular polygonal cross-section.

4. The system of claim 2 wherein the sidewalls of the base portion and the mid-pole portion have a 16-sided regular polygonal cross-section.

5. The system of claim 1 wherein the sidewalls of the base portion and the mid-pole portion are tapered with a cross-sectional diameter that decreases from the bottom end of the base portion to the top end of the mid-pole portion.

6. The system of claim 1 wherein the aperture cover is a removable panel.

7. The system of claim 1, further comprising an aperture proximate the top end of the mid-pole portion.

8. The system of claim 1 wherein the shroud material comprises Kevlar® material.

9. The system of claim 1 wherein the shroud material comprises Gore-Tex® material.

10. The system of claim 1 wherein the shroud material comprises a polyvinyl chloride (PVC) material.

11. The system of claim 1 wherein the shroud material comprises a non-conductive material.

12. The system of claim 1 wherein the shroud material comprises a polytetrafluoroethylene material.

13. The system of claim 1 wherein the top section further comprises:
    a top shroud frame positioned proximate the top end of the top tower portion; and
    a bottom shroud frame positioned proximate the bottom end of the top tower portion.

14. The system of claim 1 wherein the top end of the base portion and the bottom end of the mid-pole portion are sized such that one slips inside the other.

15. The system of claim 1, further comprising an equipment cabinet configured to receive and retain electronic equipment used to operate the cellular radio, the equipment cabinet sized to fit within the first access aperture.

16. The system of claim 1, further comprising a second access aperture positioned in the sidewall of the base portion to permit access to the interior portion.

17. The system of claim 16, further comprising a battery cabinet configured to receive and retain batteries used to operate the cellular radio, the equipment cabinet sized to fit within the second access aperture.

18. The system of claim 16 wherein the first access aperture and the second access aperture are substantially the same size.

19. A method of using a cell tower mounted at a tower location site, comprising:
    assembling a monopole having a base portion, comprising a buried portion and an equipment mounting portion, a mid-pole portion, and a top tower portion with each of the plurality of portions having a bottom end and a top end and a sidewall extending from the bottom end to the top end to define an interior;
    installing the cell tower at the tower location site by directly embedding the buried portion of the base portion into the ground below grade at the tower location site with a top end of the buried portion extending above grade;
    attaching the equipment mounting portion to the buried portion top end, the mid-pole portion positioned between the base portion and the top tower portion with the mid-pole portion bottom end coupled to the top end of the equipment mounting portion and the mid-pole portion top end coupled to the bottom end of the top pole portion;

attaching the top tower portion to the mid-pole portion using a first mounting member positioned at the top end of the mid-pole portion and a second mounting member positioned at the bottom end of the top tower portion and sized to mate with the first mounting member to thereby connect the top tower portion with the mid-pole portion;

installing electronic equipment in a first access aperture in the base portion;

mounting cellular radio antenna components to the top tower portion;

mounting radio frequency (RF) components of a cellular radio to the top tower portion;

mounting RF components of a microwave radio to the top tower portion; and attaching a shroud to the top tower portion to extend around the cellular radio antenna components, the shroud being made from a material selected to provide a visibly opaque barrier and to have radio frequency characteristics that does not impede the transmission of radio frequency signals.

20. The method of claim 19 wherein the sidewalls of the base portion and the mid-pole portion have a 12-sided regular polygonal cross-section.

21. The method of claim 19 wherein the sidewalls of the base portion and the mid-pole portion have a 16-sided regular polygonal cross-section.

22. The method of claim 19 wherein the shroud material comprises Kevlar® material.

23. The method of claim 19 wherein the shroud material comprises Gore-Tex® material.

24. The method of claim 19 wherein the shroud material comprises a polyvinyl chloride (PVC) material.

25. The method of claim 19 wherein the shroud material comprises a non-conductive material.

26. The method of claim 19 wherein the shroud material comprises a polytetrafluoroethylene material.

27. The method of claim 19 wherein the top section further comprises a top shroud frame positioned proximate the top end of the top tower portion and a bottom shroud frame positioned proximate the bottom end of the top tower portion and installing the shroud comprises attaching the shroud to the top and bottom shroud frames.

28. The method of claim 19 wherein the top end of the base portion and the bottom end of the mid-pole portion are sized such that one slips inside the other and assembling the monopole comprises joining the base portion and the mid-pole portion by slipping one inside the other.

29. The method of claim 19 for use with an equipment cabinet configured to receive and retain electronic equipment used to operate the cellular radio, the equipment cabinet sized to fit within the first access aperture wherein installing the electronic equipment comprises installing the electronic equipment in the equipment cabinet and installing the equipment cabinet within the first access aperture.

30. The method of claim 19 for use with a second access aperture positioned in the sidewall of the base portion to permit access to the interior portion, the method further comprising installing batteries, used to operate the cellular radio, in the second access aperture.

31. The method of claim 30 for use with a battery cabinet configured to receive and retain the batteries, the method further comprising installing the batteries in the battery cabinet and installing the battery cabinet within the second access aperture.

* * * * *